United States Patent [19]

Sciabarassi

[11] Patent Number: 5,105,485
[45] Date of Patent: Apr. 21, 1992

[54] DRAINBOARD

[76] Inventor: Augustine Sciabarassi, 8 Laurel La., Levittown, N.Y. 11756

[21] Appl. No.: 373,346

[22] Filed: Jun. 29, 1989

[51] Int. Cl.$^5$ .................... A47J 47/20; A47L 19/02
[52] U.S. Cl. ........................... 4/656; 4/637; 108/24; 211/41; D32/56
[58] Field of Search ............. 4/637, 656, 661, 650, 4/656; 108/24; D32/56, 55; 211/41; D7/46

[56] References Cited

U.S. PATENT DOCUMENTS

| | | | |
|---|---|---|---|
| 1,185,677 | 6/1916 | Jargstorf | 211/41 X |
| 1,224,838 | 5/1917 | Blissman et al. | 4/656 X |
| 1,323,078 | 11/1919 | Loudon | 4/637 X |
| 1,789,232 | 1/1931 | Hartz | 211/41 |
| 2,262,767 | 11/1941 | Jeter | 108/24 X |
| 4,480,343 | 11/1984 | Drach | 4/637 X |
| 4,589,150 | 5/1986 | Sciabarassi | 4/656 |

FOREIGN PATENT DOCUMENTS

| | | | |
|---|---|---|---|
| 1187348 | 2/1965 | Fed. Rep. of Germany | 108/24 |
| 40350 | 3/1937 | Netherlands | 4/656 |

Primary Examiner—Henry K. Artis

[57] ABSTRACT

The present invention provides a drainboard for draining excess water from wet kitchenware into a sink set into a countertop in alternate corner and conventional installations. The drainboard preferably comprises an essentially planar member having a major portion and a sidewall portion to collect excess water on the top surface of the major portion. The planar member is pivoted about the drain and located on opposite transverse sides of the sink with the drain positioned over the sink. The outer periphery of the planar member, preferably formed by the sidewall portion, divides the planar member into a rear section and an essentially triangular front section having a pair of opposed front sides swept back from the drain to the rear section, preferably at an angle of about 90 degrees, to minimize the obstruction of the sink when the drain is positioned over the sink. Preferably, a plurality of legs of linearly increasing size are connected to the bottom surface of the major portion to produce a flow direction of the excess water into the drain and to form a guide to abut against the transverse sides of the sink to facilitate the positioning of the drain over the sink and near the transverse sides of the sink and the front sides parallel to the transverse sides of the sink, in case of a corner installation, in order to also minimize the space on the countertop covered by the planar member.

9 Claims, 2 Drawing Sheets

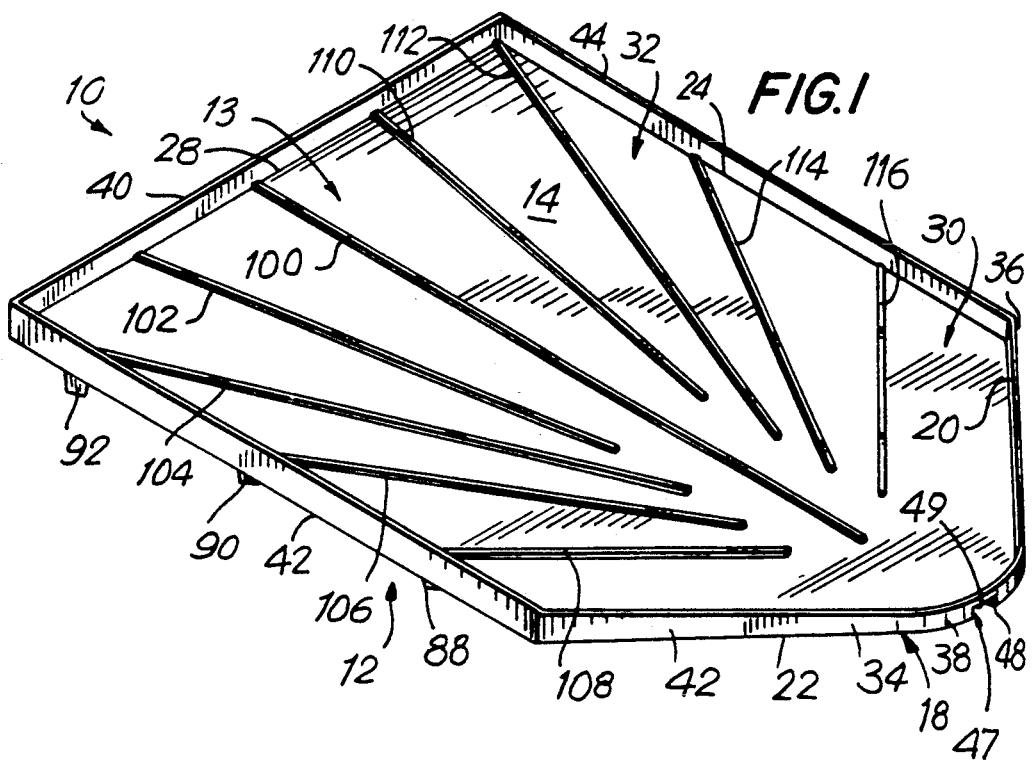
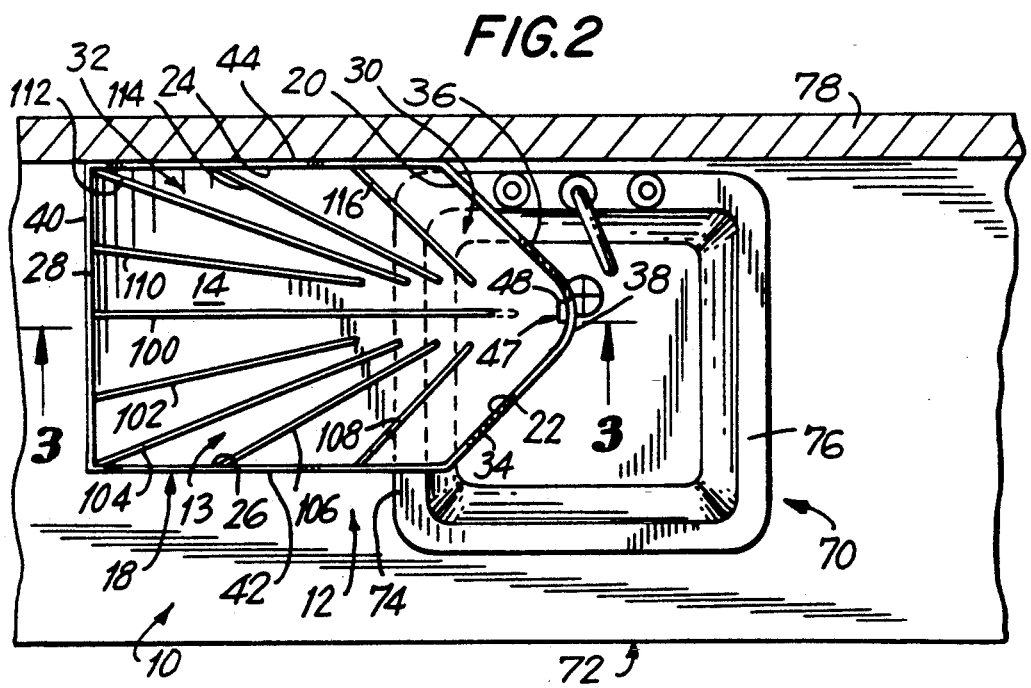

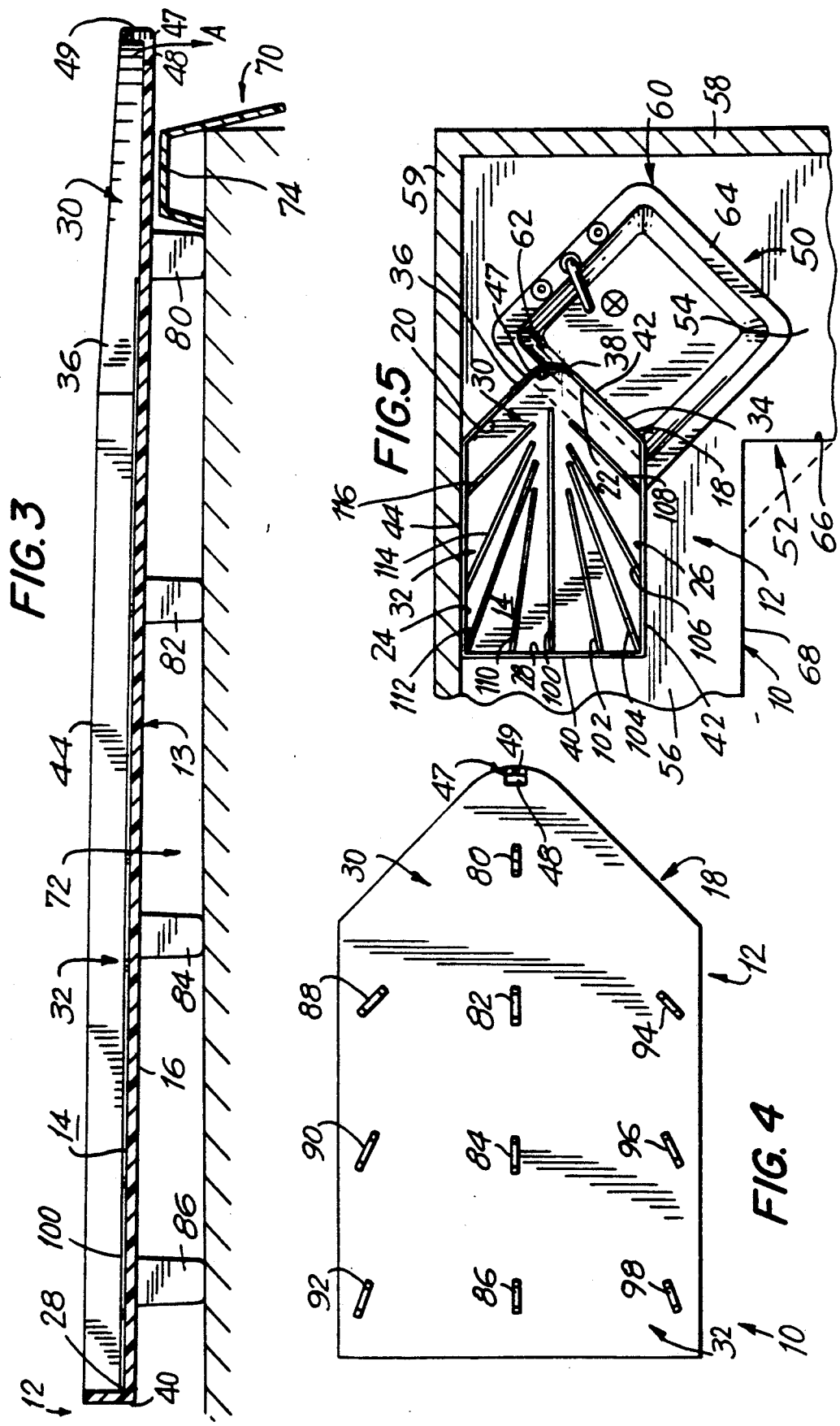

DRAINBOARD

FIELD OF THE INVENTION

The present invention relates to drainboards to drain water from wet kitchenware into sinks set into countertops in corner and conventional sink installations in which, respectively, the sides of the sink are oriented at about 45 degrees and 90 degrees to the sides of the countertop and more particularly, to a drainboard pivotable about a drain located in an essentially triangular front section of the drainboard to minimize the degree to which the sink is obstructed by the drainboard when the drain is positioned over the sink.

BACKGROUND OF THE INVENTION

Drainboards, as well known in the art, are placed on a countertop on one side of a sink in order to support wet kitchenware, such as dishes, flatware etc., above the countertop. The kitchenware may be placed directly on the drainboard or may be mounted on a dishrack that is in turn placed on the drainboard. After a period of time, the kitchenware dries by the process of evaporation.

Examples of prior art drainboards may be found in U.S. Pat. No. 678,008, U.S. Pat. No. 993,180, U.S. Pat. No. 1,223,838, U.S. Design Pat. No. 143,516, and U.S. Design Pat. No. 151,047. The drainboards in all of these patents are of rectangular form and have a front edge that is adapted to extend over the sides of the sink so that excess water from the kitchenware, that collects on the top of such drainboards, flows into the sink from the front edge.

All of such drainboards, mentioned above, are unsuitable when the sink is set into the countertop in a corner installation. As well known in the art, in a corner installation, the sink is mounted in the corner of an L-shaped countertop that may be formed by a pair of rectangular countertop sections that are connected end to end and at right angles in the corner of a room. The sides of the sink form an angle of about 45 degrees with the sides of the countertop and the adjacent walls forming the corner of the room. In such a sink installation, there is not enough space between the walls of the room and the sides of the sink to allow a prior art rectangular drainboard to be oriented toward the walls of the room with its front edge over the sides of the sink. If the drainboard is oriented away from the walls of the room, it is found that, although the drainboard may be positioned with its front edge over the sides of the sink, the front portion of the drainboard obstructs the sink to an unacceptable degree. This is not acceptable because the obstruction of the sink by the drainboard limits the amount of kitchenware that can be contained in the sink.

In an attempt to solve this problem, the prior art has also provided rectangular drainboards of reduced size to fit between the sides of the sink and the walls of the room. The problem with such drainboards is that they have limited carrying capacity and cannot be used with a full sized dishrack.

U.S. Pat. No. 4,589,150, of which I am the inventor, provides a drainboard that is specifically designed to be used in a corner sink installation and that can carry a normal load of kitchenware or a full sized dishrack. The drainboard of this patent is provided with an oblique leading edge and the drainboard may be reversed, or flipped over the leading edge, to allow such drainboard to be positioned on either of the sides of the sink, entirely on the countertop while clearing the walls of the room, with the leading edge extending over the sides of the sink. The drainboard is designed so that water from the kitchenware flows over the leading edge and into the sink.

The drainboard of U.S. Pat. No. 4,589,150, however, has much the same drawbacks as the rectangular drainboards of the patents noted above when used in a sink that is set into the countertop in a conventional installation. In a conventional sink installation, the sink is mounted in a single countertop section of an L-shaped countertop or a countertop having an elongated rectangular form with the sides of the sink at right angles to the sides of the countertop. Since the front edge of such drainboard must extend over the sides of the sink in order for water to drain into the sink, the drainboard must be angled to the sides of the sink. If the countertop is mounted against the wall of a room, generally, there is not enough room between the sides of the sink and the wall to allow the drainboard to be oriented towards the wall to angle the drainboard to the sides of the sink. If one attempts to angle the drainboard away from the wall, a portion of the drainboard may extend over one of the sides of the countertop. This is particularly disadvantageous in that the drainboard and kitchenware may accidentally fall off the countertop through accidental contact with the portion of the drainboard extending over the one side of the countertop. Although it is possible to position the drainboard in an in line relationship to the sink and extend the front edge of the drainboard over the sides of the sink, it is undesirable in that the front of the drainboard obstructs the sink to an unacceptable degree.

The present invention improves on the aforesaid drainboards by providing a drainboard that can be used in any type of sink installation, whether a corner sink installation or a conventional sink installation.

SUMMARY OF THE INVENTION

The present invention provides a drainboard for draining excess water from wet kitchenware into a rectangular sink set into a countertop in a corner installation and, alternatively, a conventional installation. The drainboard comprises an essentially planar member having means for collecting excess water on the top of the planar member, means for producing a flow direction of the excess water from the back to the front of the planar member, and means for draining the excess water from the top of the planar member into the sink. The outer periphery of the planar member divides the planar member into an essentially triangular front section at the front of the planar member and a rear section at the back of the planar member.

The draining means are centrally located at the front of the planar member such that the planer member may be pivoted about the draining means, through an angle of about 90 degrees in case of a corner installation and, alternately, through an angle of about 180 degrees, in case of a conventional installation, and may thereafter be located on opposite transverse sides of the sink with the draining means positioned over the sink to drain the excess water into the sink. The rear section supports the kitchenware above the countertop and the front section has at least two opposed front sides swept back from the drain to the rear section to minimize the degree to which the front section obstructs the sink when the draining means is positioned over the sink.

BRIEF DESCRIPTION OF THE DRAWINGS

Additional features and advantages of the present invention will become more apparent from a consideration of the following detailed description when taken in conjunction with the accompanying drawings in which:

FIG. 1 is a perspective view of a drainboard constructed in accordance with the present invention;

FIG. 2 is an illustration of the drainboard of FIG. 1 used in conjunction with a sink set into a countertop in a conventional installation;

FIG. 3 is a sectional view taken along line 3-3 of FIG. 2;

FIG. 4 is a bottom plan view of the drainboard illustrated in FIG. 1; and

FIG. 5 is an illustration of the drainboard of FIG. 1 used in conjunction with a sink set into a countertop in a corner installation.

DESCRIPTION OF THE PREFERRED EMBODIMENTS

Referring to FIGS. 1 and 4, numeral 10 represents a drainboard in accordance with the present invention. Drainboard 10 preferably comprises an essentially planar member 12 to support kitchenware or a dishrack on which kitchenware is mounted. Planar member 12 has a major portion 13 that includes a pair of top and bottom surfaces 14 and 16 and a periphery preferably formed by a sidewall portion 18 connected to the front, side and back edges, 20-28, of major portion 13. The periphery or preferably sidewall portion 18 divides member 12 into an essentially triangular front section 30 and a rear section 32.

It should be pointed out that as another possible embodiment of the present invention, sidewall portion 18 could be deleted. In such embodiment, major portion 13 would be formed with a V-like transverse cross-section or, in other words, centrally creased along its length dimension such that excess water from the wet kitchenware pooled or collected on top surface 14.

Front section 30 includes a pair of opposed front sides 34 and 36 of equal length, formed by two segments of sidewall 18, that are swept back from a drain 47, that will be discussed herinafter, toward rear section 32. Front sides 34 and 36 are preferably offset from one another at an angle of about 90 degrees. Preferably an arcuate nose 38, connects front sides 34 and 36 to one another. As may be appreciated, in a possible alternative embodiment, nose 38 could be deleted and front sides 34 and 36 could be connected directly to one another. However, in such a possible embodiment, in order to perform such a connection, the length of sides 34 and 36 would have to be increased. Since, as will be discussed, the drain is positioned over the sink to drain the excess water into the sink, the increases in the length of sides 34 and 36 would cause an increase in the size of front section 30. This would not be desirable in that the increase in the size of front section 30 would increase the obstruction of the sink by the front section.

Rear section 32 preferably is of rectangular configuration and has a rear side 40 spaced from front sides 34 and 36 and a pair of parallel lateral sides 42 and 44 connecting rear side 40 to front sides 34 and 36. As illustrated, the sides of rear section 32 are formed by segments of sidewall 18. The rectangular area thereby formed on top surface 14 is sized to accommodate a full size dishrack on which the wet kitchenware may be mounted. It is understood however, that rear section 32 could be formed in other shapes, such as a semi-circle. However, this would not be preferred in that, for instance, a semi-circle would not be large enough to accomodate a full load of wet kitchenware or a full sized dishrack.

A drain 47, located between front sides 34 and 36, is provided to drain excess water from top surface 14 (as indicated by arrowhead A of FIG. 3) into a sink. Preferably drain 47 comprises front section 30 having a cutout 48 defined in major portion 13 and sidewall 18 having an open ended slot 49 defined in the apex of nose 38 in communication with open cutout 48. It is understood that an embodiment of the present invention could be formed with only cutout 48 or with only open ended slot 49. Moreover, it is also possible to form an embodiment of the present invention in which the drain is formed by a bore communicating between top and bottom surfaces 14 and 16. Such bore could be countersunk from the top surface and spaced from the apex of nose 38.

As will be discussed hereinafter means, preferably in the form of legs, are provided for downwardly angling planar member 12 towards the drain so that excess collected water flows in a direction from the back to the front of planar member 12 and out drain 47. In this regard, an additional advantage inherent in the design of the preferred embodiment is that the segments of sidewall 18 forming front sides 34 and 36 conduct such excess water to the drain 47.

With reference to FIG. 5, a corner sink installation is illustrated that consists of a raised rim sink 50 set into the corner of an L-shaped countertop 52. Countertop 52 is formed in a manner well known in the art by a pair of rectangular countertop sections 54 and 56 that intersect one another, at right angles, in the corner of a room. The corner of the room is formed by a pair of walls 58 and 59 that are also connected to one another at right angles. Sink 50 is provided with a rectangular raised rim 60 that extends above the surface of countertop 52 and has a pair of opposed transverse sides 62 and 64 forming an angle of about 45 degrees with the lengthwise edges 66 and 68 of countertop sections 54 and 56 and also walls 58 and 59.

The front sides 34 and 36, which extend on either side of drain 47, are sized to allow drain 47 to be located over sink 50 and member 12 to be located to side 62 of sink 50 by extending front side 34 over side 62 of sink 50. Although not illustrated, member 12 could be positioned to the other side 64 of sink 50, with drain 47 over sink 50, by pivoting member 12 about drain 47, through an angle of about 90 degrees, and by extending front side 36 over side 64 of sink 50.

In the particular corner sink installation illustrated, lateral side 44 of rear section 32 abuts against wall 59. It is understood however that with different sized sinks or if sink 50 were spaced a greater distance from the corner formed by walls 58 and 59, side 44 of rear section 32 could be spaced from wall 59.

As is also apparent from FIG. 5, front sides 34 and 36 are each preferably no longer than either of the sides 62 and 64 of sink 50 and are preferably much shorter than sides 62 and 64. In a corner sink installation in which the sink is smaller than sink 50 or in which the sink is spaced a greater distance from the corner of the countertop, the aforementioned sizing of front sides 34 and 36, relative to the size of the sink, allow the drainboard to moved along the sides of the sink and, thus, allow some latitude in the position of drainboard 10 on the countertop. As may be appreciated, the drainboard of the present invention could be designed in different sizes to be used with sinks of varying size.

As indicated previously, front sides 34 and 36 are preferably offset at an angle of 90 degrees. The major advantage of this is that in a corner installation of the sink, front sides 34 and 36 may be positioned very close and parallel to the sides of a sink in order to minimize the degree to which the front section obstructs the sink and also, to minimize the space on the countertop covered by member 12. This is advantageous in that ofter appliances, storage containers, etc. are placed on countertops.

It is understood, however, that a possible embodiment of drainboard 10 could be formed with front sides 34 and 36 offset from one another at an angle greater or less than 90 degrees. Obviously, if the angle chosen is less than 90 degrees, the degree that front section 30 obstructs the sink will be decreased, even over the preferred embodiment, in that when drain 47 is extended over the sides of the sink, front sides 34 and 36 will both be angled from the sides of the sink rather than extending over the sides of the sink. However, as may be also appreciated, the possible decrease in the offset angle would cause the drainboard of such embodiment to be longer than the preferred embodiment and, thus, take up more space on the countertop. If, on the other hand, the offset angle is made much greater than 90 degrees, although planar member 12 will take up less space on the countertop, more of the drainboard will extend over the sink and increase the degree of obstruction of the sink by front section 30.

FIG. 2 illustrates drainboard 10 used in connection with a sink 70 set into a rectangular countertop 72 in a conventional installation. Sink 70 has a raised rim and, thus, the sides 74 and 76 of sink 70 extend above the surface of countertop 72. As illustrated, in the conventional installation, sides 74 and 76 are oriented at right angles to a wall 78 adjacent to countertop 72 and the sides of countertop 72.

Member 12 may be located to either side 74 and 76 of sink 70 with drain 47 over sink 70 by extending nose 38 over sides 74 and 76 of sink 70. Although member 12 is illustrated in a position located to side 74 of sink 70, as may be appreciated, member 12 could be positioned at a location to side 76 of sink 70 by simply pivoting member 12 about drain 47 through an angle of about 180 degrees.

With specific reference again to FIG. 4, and now also to FIG. 3, as indicated previously, means are provided to downwardly angle member 12 towards drain 47 so that excess collected water on top surface 14 flows toward sections of sidewall portion 18 forming front sides 34 and 36. These means preferably comprise a plurality of legs 80-98. Legs 80-98 depend from bottom surface 16 of member 12 and are spaced apart from one another and thereby to support member 12 above either of the countertops described above. An added advantage of legs 80-98 is that they are sized to support member 12 a sufficient distance above the countertop so that bottom surface 16 clears the rim of a raised rim sink.

Legs 80-98 also preferably serve as a guide for drainboard 10 to prevent the drainboard from falling into the sink, to position drain 47 over the sink, and, in the case of a corner sink installation, to orient sides 34 and 36 parallel to the sides of the sink. To this end, legs 80-98 are preferably arranged in a central column of four legs (80-86), along the length dimension of member 12, and a pair of opposite columns of three legs (88-92; and 94-98), on either side of the central row. Legs 80, 88 and 94, located adjacent to the front of planar member 12, define the corners of an isoseles triangle geometrically similar to front section 30. These aforementioned legs perform the guiding function of the legs, discussed above.

When drainboard 10 is used with a raised rim sink, conventionally installed in the manner of sink 70, leg 80 that forms the vertex of the triangle may be positioned against either of the sides of the sink in an abutting relationship and serve in the guiding function, described above. To this end, leg 80 is spaced behind drain 47 so that when leg 80 abuts against the sides of a conventionally installed sink, drain 47 is positioned adjacent, or just over, the sides of the sink so that the degree to which front section 30 obstructs the sink is minimized.

When the sink is installed in a corner installation, such as sink 50, since each triangular array of legs are geometrically similar to front section 30, the legs forming the sides of the triangle, namely, legs 88, 80 and 80, 94; are parallel to front sides 34 and 36, and thus, are offset at an angle equal to that of front sides 34 and 36, preferably, about 90 degrees. This allows legs 80, 88 to be positioned against the side 62 of sink 50 to prevent drainboard 10 from falling into sink and to also align front side 34 in a parallel relationship to side 62 of sink 50. Additionally, legs 80, 94 may be alternately positioned against side 64 of sink 50 to prevent drainboard 10 from falling into sink 50 and, also, to align front side 36 in a parallel relationship to side 64 of sink 50.

Each of the legs 80-98 preferably has a tab-like configuration. In order to further aid in guiding drainboard 10 relative to a corner sink installation, and also, for aesthetics, each of the side columns of legs, namely, legs 88, 90, 92; and 94, 96, 98, are oriented parallel to front sides 34 and 36 to lie flush against the transverse sides of the sink when in a corner installation. The central row of legs, legs 80-86 are preferably oriented parallel to the length dimension of drainboard 10.

In order to downwardly angle top surface 14 and produce the required flow of water, mentioned above, legs 80-98 increase in size in a linear fashion along the length dimension of member 12 such that member 12, and thus, its top surface 14, is downwardly angled, as mentioned above. To this end, leg 80 is the shortest of the legs; legs 82, 88 and 94 are of equal size and are slightly longer than leg 80; legs 84, 90 and 96 are of equal size and are slightly longer than legs 82, 88 and 94; and legs 86, 92 and 98 are of equal size and are again slightly longer than legs 84, 90 and 96.

Although not preferred, member 12 might be provided with a wedge-like transverse cross-section to produce the required flow of water. Such a possible embodiment would be more expensive in that it would require more material. In such an embodiment, legs could be provided so that the drainboard could be used with raised rim sinks. However, as may be appreciated, such legs would be sized equally.

It should be noted that other leg patterns could be employed in place of that illustrated herein. For instance, it would be possible to produce an embodiment of the present invention without the triangular guide arrangement provided by the front most legs, 80, 88 and 94, described above. Additionally, even in a possible embodiment incorporating the triangular guide arrangement, legs 82, 84, 86, 90 and 96 could be deleted. However, less support would be provided by the fewer remaining legs of such embodiment.

The top surface of member 12 may be provided with a plurality of elongated, non intersecting ribs 100-116 radiating from front section 30 to rear section 32. Ribs 100-116 support wet kitchenware or a dishrack, upon which wet kitchenware is mounted, above top surface 14 to aid in drying the kitchenware by allowing air to circulate below the kitchenware. Additionally, the ribs allow the excess water to flow under the kitchenware, air in the conduction of the excess water to drain 47 and prevent the kitchenware from sticking to the drainboard by the suction produced by a thin film of water between the kitchenware and the drainboard that might otherwise exist.

Member 12 together, with legs 80-98, is preferably an integrally formed component fabricated by injection plastic molding techniques known well in the art. In this regard, polystyrene is a preferred material, but polyethylene, polypropylene, and other plastics could be used as well.

While preferred embodiments of the invention have been shown and described in detail, it will be readily understood and appreciated that numerous omission, changes and additions may be made without departing from the spirit and scope of the present invention.

I claim:

1. A drainboard for draining excess water from wet kitchenware into a rectangular sink having front, rear and transverse sides and mounted into a countertop in a corner installation wherein the sink is mounted in a corner of a countertop having countertop sections extending orthogonally with respect to each other such that a front side of said sink extends at a 45 degree angle with respect to front edges of said countertop sections and, alternately, a conventional installation wherein the sink is mounted into a countertop such that a front edge of said sink is parallel with a front edge of said countertop, said drainboard comprising:
an essentially planar member having top and bottom surfaces, a front section to be located adjacent the sink, and a rear section to extend away from said sink,
means for collecting the excess water on the top surface of the planar member,
means for producing a flow direction of the excess water from the back section to the front section of the planar member,
means for draining the excess water from the top surface of the planar member into the sink,
said draining means comprising an aperture extending through said planar member and being centrally located on the front section of the planar member such that said planar member may be rotated through an angle of about 90 degrees in case of a corner installation and, alternately, through an angle of about 180 degrees in case of a conventional installation, and located on opposite transverse sides of the sink with said draining means positioned over the sink to drain the excess water into the sink, and
said bottom surface having means for supporting the planar member above the countertop, said rear section having means for supporting the kitchenware above the upper surface, said front section being essentially triangular in shape and having at least two opposed front sidewalls of equal length swept back from said draining means to said rear section to minimize the degree to which said front section obstructs the sink when said draining means is positioned over the sink,
said two front sidewalls of said front section set at right angles to one another and said drain aperture being located adjacent the intersection of said two front sidewalls, such that in case of a corner sink installation, when said planar member is located on opposite transverse sides of the sink; one of said two front sidewalls of said front section is positioned adjacent to and very close to and parallel to one of the transverse sides of the sink and the other of said two front sidewalls of said front section is positioned parallel to the rear side of the sink and said draining means is positioned entirely over said sink in order to minimize the degree to which said front section obstructs the sink while also minimizing the amount of space on the countertop covered by the planar member.

2. The drainboard of claim 1 wherein said rear section has a rectangular configuration to provide a rectangular area on the top of the planar member to support the wet kitchenware.

3. The drainboard of claim 1 wherein:
said two front sidewalls intersect to form an arcuate nose; and
said drain aperture is located adjacent the apex of said arcuate nose to further minimize the degree to which said front section obstructs the sink.

4. The drainboard of claim 3 wherein:
said excess water collection means comprises said two front sidewalls contiguous with an upstanding sidewall connected to peripheral edges of said rear section such that the excess water collects on said top surface; and
said draining means further comprises an open ended slot extending through said nose of said front section and said aperture in said planar member being cutout to form a single opening with said open ended slot.

5. The drainboard of claim 4 further wherein said kitchenware supporting means includes a plurality of elongate, non-intersecting ribs connected to said to surface and radiating from said front section to said rear section to support the kitchenware above said top surface.

6. The drainboard of claim 1 wherein:
the sink is a raised rim sink in which the opposite transverse sides of the sink extend above the countertop; and
said excess water flow direction means comprises a plurality of legs connected to and depending from the opposite bottom surface of said planar member to rest upon the countertop, the said legs linearly increasing in size along the length dimension of the planar member, thereby to support said planar member above the countertop such that the bottom of said planar member clears the opposite sides of the sink and said planar member downwardly slopes toward said draining means.

7. The drainboard of claim 6 wherein said plurality of legs are arranged to form a triangular guide adjacent to the front section of the planar member to abut against the transverse sides of the sink in order to prevent the planar member from sliding into the sink, to position said draining means near the transverse sides of the sink and over the sink and, in case of a corner sink installation, to orient said planar member such that one of said at least two front sides of said front section is positioned parallel to one of the transverse sides of the sink when said planar member is to one side of the sink and the other of said at least two front sides of said front section is positioned parallel to the other of the transverse sides of the sink when said planar member is on the other side of the sink.

8. The drainboard of claim 7 wherein said plurality of legs includes a central column of four said legs spaced along the length dimension of said planar member and a pair of opposite columns of three said legs located on either side of said central column and even with three said legs of said central column such that said legs of said central and said opposite columns located adjacent to the front section of the planar member define the corners of an isosles triangle geometrically similar to said front section and thereby form said triangular guide.

9. The drainboard of claim 8 wherein each of said legs has a tab-like configuration and said legs are oriented such that each of said legs of said central column is parallel to the length dimension of said planar member and each of said legs of said opposite columns are parallel to said at least two sides of said front section to lie flush against the transverse sides of the sink in case of a corner installation and thereby to facilitate the positioning of said at least two front edges parallel to the transverse sides of the sink.

* * * * *